United States Patent [19]

Siedenstrang et al.

[11] 4,288,399
[45] Sep. 8, 1981

[54] PROCESS FOR LOW PRESSURE MOLDING THERMOPLASTIC ELASTOMER COMPOSITIONS

[75] Inventors: Roy W. Siedenstrang; William H. Cornell, both of Stow, Ohio

[73] Assignee: Phillips Petroleum Company, Bartlesville, Okla.

[21] Appl. No.: 825,175

[22] Filed: Aug. 17, 1977

[51] Int. Cl.$^3$ .............................................. B29C 3/00
[52] U.S. Cl. .................... 264/25; 204/159.14; 204/159.18; 260/31.6; 260/32.4; 260/32.6 A; 260/32.6 N; 260/33.2 R; 260/33.4 R; 260/33.4 PQ; 264/22; 264/26; 264/42; 264/59; 525/96; 525/98; 525/99; 525/901
[58] Field of Search ...................... 264/25, 22, 26, 331, 264/42, 59; 260/32.6 N, 32.6 A, 33.2 R, 33.4 R, 33.4 PQ, 31.6, 324; 204/159.14, 159.2, 159.18; 525/96, 98, 99, 901

[56] References Cited

U.S. PATENT DOCUMENTS

| | | | |
|---|---|---|---|
| 3,049,517 | 8/1962 | Caton | 264/DIG. 59 |
| 3,102,303 | 9/1963 | Lainson | 264/DIG. 42 |
| 3,113,912 | 12/1963 | Kraus et al. | 204/159.2 |
| 3,471,352 | 10/1967 | Brooke et al. | 156/272 |
| 3,624,189 | 11/1971 | Goldman | 264/25 |
| 3,660,552 | 5/1972 | Hinz et al. | 264/25 |
| 3,701,702 | 10/1972 | Shichman et al. | 156/244 |
| 3,737,488 | 6/1973 | Porter et al. | 264/26 |
| 3,803,274 | 4/1974 | Nakashima et al. | 264/26 |
| 3,823,109 | 7/1974 | Middlebrook | 260/23.7 R |
| 3,826,776 | 7/1974 | Wright | 260/42.14 |
| 3,832,111 | 8/1974 | Dunlap et al. | 425/174.2 |
| 3,846,265 | 11/1974 | Yamaguchi et al. | 264/331 |
| 3,846,521 | 11/1974 | Osterholtz | 264/331 |
| 3,936,365 | 2/1976 | Saunders et al. | 204/159.14 |
| 3,959,545 | 5/1976 | Siedenstrang | 260/32.6 A |
| 3,985,702 | 10/1976 | Himes | 260/33.6 AQ |
| 4,008,295 | 2/1977 | Koshida et al. | 260/891 |
| 4,035,467 | 7/1977 | Campbell et al. | 264/331 |
| 4,097,550 | 6/1978 | Haaf et al. | 260/892 |
| 4,115,509 | 9/1978 | Kendall-Smith et al. | 264/331 |

FOREIGN PATENT DOCUMENTS

| | | | |
|---|---|---|---|
| 1068933 | 5/1967 | United Kingdom | 264/25 |
| 1242509 | 8/1971 | United Kingdom | . |
| 1242510 | 8/1971 | United Kingdom | . |

OTHER PUBLICATIONS

"Microwave Technology Penetrating CPI Markets", Chem. Eng. News, Jan. 3, 1977, pp. 50, 52 and 54.
Rubber Technology, Mar. 1971, vol. 44, #1, pp. 294–305, IPPEN.
Microwave Power for Fast Curing, vol. 44, #5, May 1963, Rubber & Plastic Age.
Plastics-Microwave Pros & Cons., SPE Journal, vol. 1968, vol. 24, pp. 29–32.

Primary Examiner—Joseph L. Schofer
Assistant Examiner—Herbert J. Lilling

[57] ABSTRACT

Compositions comprising a thermoplastic elastomer, e.g., radial block butadiene/styrene copolymer, solid resinous polymer, e.g., vinyl-substituted aromatics, and one or more specific polar compounds. The specific polar compounds are chosen from among simple and polymeric alkaline glycols, their mono and dialkyl ethers; ethanolamines, isopropanolamines, and their hydrocarbyl-substituted derivatives; liquid acrylonitrile/butadiene polymers; acrylonitrile/butadiene blends with homopolymers of polyvinyl chloride and styrene/acrylonitrile copolymers; and mixtures thereof. A method using these compositions for producing molded objects at a molding pressure of up to about 200 psig. Molded objects produced from these compositions and molded objects produced by this method of molding.

7 Claims, No Drawings

PROCESS FOR LOW PRESSURE MOLDING THERMOPLASTIC ELASTOMER COMPOSITIONS

BACKGROUND OF THE INVENTION

This invention relates to molding compositions. In one of its more specific aspects this invention relates to thermoplastic molding compositions. More particularly, the invention relates to thermoplastic molding compositions containing polar compounds. In another aspect of the invention it relates to a method for molding thermoplastic molding compositions. More particularly, the invention specifically relates to the use of energy of microwave frequency in molding thermoplastic compositions. In yet another aspect the invention relates to objects molded of thermoplastic molding compositions.

In the past, microwave energy has been used in vulcanizing techniques to raise the temperature of vulcanizable compositions containing polar compounds to a level at which vulcanization can be accelerated by conventional means. It has now been discovered that microwave energy can be used to increase the temperature of polymer/resin compositions containing polar compounds above the softening point to permit low pressure molding. A number of polar components and polymers that will work well to promote the start of vulcanization using microwave energy are not, however, useful in promoting softening of thermoplastic compositions. Temperatures obtained within practical time cycles are not enough to overcome the flow deficiency caused by the addition of solid nonthermoplastic polar polymers such as halogenated rubbers, nitrile rubbers, and/or fillers such as carbon black. It should also be pointed out that highly filled resins do not react well to microwave energy so that highly filled thermoplastic elastomer based stocks result in lower melt flow rates because of lesser percentages of polymer in the total composition. Limited compatibility with thermoplastic elastomers also contributes to lack of efficiency of some ingredients which proved useful in promoting vulcanization, but are not useful in promoting softening of thermoplastic compositions. Overall, it has been found that polar compounds useful in thermoplastic compositions used in low pressure molding must be selectively chosen.

It is therefore an object of this invention to provide compositions of matter that can be molded at pressures below about 200 psig. More particularly, it is an object of this invention to provide thermoplastic molding compositions containing polar compounds that can be molded at low pressures. It is another object of this invention to provide a method for molding thermoplastic compositions containing polar compounds. More particularly, it is an object of this invention to provide a method for molding thermoplastic compositions using energy at microwave frequencies in the molding process. It is still another object of this invention to provide molded objects of thermoplastic molding compositions containing polar compounds.

Other aspects, objects, and the various advantages of this invention will become apparent upon reading this specification and the appended claims.

STATEMENT OF THE INVENTION

Compositions are provided comprising a major amount of thermoplastic elastomer and minor amounts of solid resinous polymers along with one or more specific polar compounds so that the resulting compositions can be readily preheated by exposure to energy at microwave frequency to a moldable consistency that can be molded at a pressure of 200 psig or less.

In one embodiment of the invention a method for molding articles is provided in which molding composition solids as described above are introduced into a mold and enclosed therein, with the application of microwave energy to the composition for a time sufficient to produce a moldable consistency in the composition. Thereafter, molding pressure, up to about 200 psig, is applied to the molding composition for a time sufficient to produce a molded article after which the mold is cooled and the cooled molded article is unmolded.

In yet another embodiment of the invention molded articles are provided which are produced from a molding composition as described above and/or are produced by the method of molding described above.

The invention described herein can be otherwise stated as follows: compositions comprising a major amount of a thermoplastic elastomer, e.g., radial block butadiene-styrene copolymer and minor amounts of solid resinous polymers, stabilizers, fillers, plasticizers, and one or more polar compounds form the basis of this invention. The resulting compositions are particularly adaptable to preheating by the application of energy at microwave frequency after which they can be molded under low pressure into various useful articles, e.g., sheet stock, shoe soles, mats, watch bands, and the like.

The thermoplastic elastomers useful in practicing this invention are normally solid linear and radial teleblock copolymers which characteristically exhibit high tensile strength and elongation in their natural condition, e.g., nonvulcanized state. The copolymers are described in more detail in U.S. Pat. Nos. 3,823,109; 3,826,776 and 3,959,545. Particularly suitable copolymers are those derived from butadiene and styrene in which the butadiene to styrene ratio can vary from about 85/15 to about 45/55 parts by weight and the rubber will contain from about 10 to about 55 wt. % of the styrene incorporated as terminal polystyrene blocks.

The amount of the thermoplastic elastomer employed in the compositions constitutes from about 30 to about 100 wt. % of the total polymers utilized in preparing the compositions.

The other polymers employed in forming the compositions, from about 0 to about 70 wt. % of total polymer utilized, are generally solid resinous polymers of a vinyl-substituted aromatic compound, e.g., styrene, alpha-methyl styrene, etc., alone or copolymerized with a monomer such as acrylonitrile or a conjugated diene such as butadiene. Such homopolymers and copolymers generally have densities in the range from about 1.04 to about 1.10 g/cc (ASTM D 792), a tensile strength in the range from about 5,000 to about 12,000 psi (34.5–82.7 MPa), ASTM D 638, and a Shore A Hardness ranging from about 35 to about 95 (ASTM D 2240) at about 23° C.

The polar compounds (polarizing agent) employed in the invention compositions are normally liquid or solid in nature and are selected from among simple and polymeric alkylene glycols and their mono and dialkyl ethers, ethanolamines and isopropanolamines and their hydrocarbyl-substituted derivatives and mixtures thereof. Exemplary compounds include ethylene glycol, 1,2-propylene glycol, 1,3-butylene glycol, 1,4-butylene glycol, 1,6-hexylene glycol, diethylene glycol, triethylene glycol, dipropylene glycol, thiodiethylene glycol, etc., polyethylene glycols having average molecular weights ranging from about 200 to about 6,000; polypropylene glycols having average molecular weights averaging from about 400 to about 2,000; mixed poly(ethylene)-poly(propylene) glycols having average molecular weights ranging up to about 6,000 and containing from about 30 to about 90 wt. % ethylene oxide; the monomethyl, monoethyl and monobutyl ethers of ethylene glycol, propylene glycol and diethylene glycol; the monomethyl and monoethyl ethers of triethylene glycol; the dimethyl and diethyl ethers of diethylene glycol, dipropylene glycol and trimethylene glycol; the alkanolamines and substituted alkanolamines based on ethanol and isopropanol such as mono-, di- and triethanolamine, mono-, di- and triisopropylamine, methylethanolamine, dibutylethanolamine, phenyldiethanolamine, di(2-ethylhexyl) ethanolamine, dimethylisopropanolamine, dibutylisopropanolamine, and the like; and mixtures thereof. Other polar compounds such as liquid acrylonitrile butadiene polymers, acrylonitrile butadiene blends with homopolymers of polyvinylchloride and styrene acrylonitrile copolymers are effective. Presently preferred compounds include diethylene glycol and triethanolamine and mixtures thereof.

Polarizing agents selected from among solid nitrile rubbers, polychloroprene polymers and carbon black are not suitable for use in the applications envisioned in the instant invention because compositions containing such agents do not flow readily under the low molding pressures utilized in the process of this invention.

Sufficient polarizing agent is included in the compositions of the instant invention to insure that they will be heat softened quickly when placed in a microwave field. Generally, the amount of polarizing agent utilized ranges from about 0.5 to about 20 parts by weight per 100 parts by weight thermoplastic elastomer and more preferably from about 0.75 to about 10 parts by weight for reasons of economy coupled with adequate response to the microwaves. Heating times employed are selected to achieve rapid softening of the compositions to moldable consistency without deleterious effects caused by local overheating. Generally, the heating times used can range from about 4 seconds to about 4 minutes. From a commercial standpoint, however, heating times ranging from about 4 to about 55 seconds are employed to obtain favorable production rates and this is a preferred range.

Other components used in preparation of the instant invention include odorants, colorants and fillers, e.g., silica, clay, silicates, e.g., Wollastonite, calcium carbonate, glass beads and fibers, and the like. Plasticizing agents compatible with the thermoplastic elastomer and other resinous polymers can be employed if desired. Examples of these include naphthenic petroleum oils, e.g., ASTM type 104A, esters of adipic acid, phthalic acid, etc. Processing aids include the metal stearates, e.g., calcium stearate, zinc stearate, silicones, natural and synthetic waxes, and the like. Antioxidants and UV stabilizers can be added as desired from suitable commercially available materials. Exemplary of these include thiodipropionic esters, e.g., dilaurylthiodipropionate, hindered phenolic antioxidants, e.g., 2,6-di-t-butyl-4-methylphenol, octadecyl[3-(3,5-di-t-butyl-4-hydroxyphenyl)]propionate, thiodiethylene bis (3,5-di-t-butyl-4-hydroxy) hydrocinnamate, etc., and UV stabilizers such as 2(2'-hydroxy-5'-methylphenyl) benzotriazole, 2-hydroxy-4-n-octoxybenzophenone, [2,2'-thiobis(4-t-octyl-phenolato)]-n-butylamine-nickel(II), etc. Generally, the amounts of the various components in parts by weight per 100 parts by weight thermoplastic elastomer (php) will be as follows: filler, 10 to 150 php, plasticizing agent 20 to 50 php; antioxidant, 0.1 to 1 php, and UV stabilizer, 0.1 to 3 php.

The molds employed in shaping the invention compositions are generally constructed from low cost, relatively low strength materials including silicone rubber, polysulfide rubber, polyurethane, plaster, cast aluminum, and the like. The nature of the mold is dependent upon the molding process used. If the invention composition is placed within the mold and the entire assembly is preheated by microwave energy, it is preferred that the mold used be made of a material such as silicone rubber that has a lower dielectric loss factor than the invention composition. It is within the scope of this invention to preheat the composition in a low dielectric loss container such as glass or ceramic and transfer it to a mold constructed from metals and the like for the actual shaping step. Generally, the composition is placed within a silicone rubber mold, the mold top is covered with a silicone sheet or a release paper, e.g., paper or the like covered with a release agent such as a silicone, and the assembly is placed between the plates of a high frequency electrical field which form a part of commercially available molding machines. The top plate is lowered to contact the release paper covering the mold and the composition is preheated by application of microwave energy for a desired length of time. After the preheating, sufficient pressure is employed to compression mold the composition, e.g., about 10 to about 200 psig (68.9–1380 kPa), for a period of time generally ranging from about 0.1 to about 10 times the preheating time. The pressure is released, the assembly is preferably placed in a separate zone for cooling the mold and contents, after which the molded article is removed. A rotary table or the like containing a plurality of molds can be employed to provide molded parts at commercially attractive rates. Separation of the heating and cooling zones speeds production and reduces consumption of power and water.

EXAMPLE 1

A series of compositions was prepared containing one or more polarizing agents by mixing the components in a Banbury mixer for 6 minutes at a temperature of about 280° F. (138° C.). Each composition was dumped from the mixer at about 250° F. (121° C.) and converted into pellets. The base formulations employed shown in Table 1A are in parts by weight.

TABLE 1A

|  | Composition A | Composition B |
|---|---|---|
| Run No. | 1–6 | 7–9 |
| Thermoplastic elastomer[a] | 100 | 100 |
| Poly(alpha-methylstyrene)[b] | 25 | 0 |
| Crystal polystyrene[c] | 15 | 50 |
| Naphthenic extender oil[d] | 40 | 40 |
| Calcium carbonate | 0 | 25 |
| Silica[e] | 20 | 25 |
| Stabilizer[f] | 0.5 | 0.5 |
| UV stabilizer[g] | 0.3 | 0 |
| Zinc stearate | 0.3 | 0.3 |
| TiO$_2$ | 0 | 3 |

TABLE 1A-continued

|  | Composition A | Composition B |
|---|---|---|
| Polarizing agent | See Table 2 |  |

Notes:
[a]Phillips Petroleum Co., Bartlesville, OK; radial teleblock butadiene/styrene (52/48) copolymer, molecular weight 300,000, extended with 60 parts by weight naphthenic oil; Shore A Hardness of 57.
[b]Amoco Chemical Corp., St. Paul, Minn., linear homopolymer, Amoco® 18-210, softening point of 210° F. (99° C.), ASTM D 36.
[c]Cosden Oil & Chemical Co., Big Spring, TX, Cosden® 500 Special.
[d]Exxon Co., Houston, TX; Flexon® 766, ASTM type 104A.
[e]PPG Industries, Inc., Pittsburgh, PA; Hi Sil® 233, precipitated, hydrated silica, 2.0 specific gravity, ultimate particle size 0.022 micron ($2.2 \times 10^{-5}$ mm).
[f]Argus Chemical Corp., Brooklyn, NY, Mark® 1589 B.
[g]Ciba-Geigy Industrial Chemicals, Ardsley, NY, 2(2'-hydroxy-5'-methylphenyl)-benzotriazole (Tinuvin® P).

Each pelleted composition was used to fill a 5/16 inch (7.9 mm) thick silicone rubber, 2-cavity shoe soling mold maintained at about 77° F. (25° C.). The average cavity depth was about 5/16 inch. After placing a paper release sheet over the mold, the assembly was placed in a commercial molding machine employing microwave energy as the heating medium, the top molding plate was lowered to contact the release paper covering the mold at a pressure of about 40 psig (276 kPa gage) and the microwave unit was energized to preheat the composition for the designated time. The microwave field was turned off, the pressure against the mold was increased to about 120 psig (827 kPa gage) and held for 45 seconds at that pressure. The pressure was released, the mold assembly was transferred to a cooling press through which water at a temperature of about 50° F. (10° C.) was being circulated and the assembly was cooled for 2 minutes by contact with the platens of the press. The molded product was stripped from the mold at about 120° F. (49° C.).

The preheat times employed and results obtained are presented in Table 1B.

TABLE 1B

| Run No. | Composition | Polarizing Agent Type | Parts by Weight | Preheat Time (Sec.)[i] | Results[j] |
|---|---|---|---|---|---|
| 1 | A | TEA[a] | 4 | 60 | good |
| 2 | A | TEA/DEG[b] | 3/3 | 25 | excellent[c] |
| 3 | A | SR 350[d] | 2 | 60 | very little melt |
| 4 | A | Sanolite MHP[e] | 5 | 60 | good |
| 5 | A | Neoprene W[f] | 10 | 60 | very little melt |
| 6 | A | Hycar 1312[g] | 10 | 60 | good to excellent |
| 7 | B | TEA/DEG | 3/3 | 60 | good |
| 8 | B | Paracril OZO[h] | 20 | 25 | excellent[c] |
| 9 | B | SR 350 | 3 | 60 | fair |

Notes:
[a]triethanolamine.
[b]diethylene glycol.
[c]very little melt produced with 15 seconds preheat.
[d]Sartomer Industries Inc., Essington, PA; solid comprising trimethylolpropane trimethacrylate, 1.06 specific gravity.
[e]Monsanto Co., St. Louis, MO, resin comprising toluenesulfonamideformaldehyde.
[f]E. I. duPont de Nemours & Co., Inc., Wilmington, Del., polychloroprene having a specific gravity of 1.23.
[g]B. F. Goodrich Chemical Co., Cleveland, OH; butadiene/acrylonitrile rubber, approx. 31 wt. % acrylonitrile, specific gravity of 0.98.
[h]Naugatuck Chemical Div., Uniroyal, Naugatuck, Conn., 50/50 blend of butadiene/acrylonitrile rubber and polyvinylchloride, 1.05 specific gravity.
[i]preheat time was varied for each composition with the least time in which acceptable results were obtained being reported.
[j]subjective, visual observation on consistency of melt.

Inspection of the results presented in Table 1B shows the most effective polarizing agents are TEA/DEG (run 2) followed by Paracril OZO (run 8) and Hycar 1312 (run 6). These runs show the TEA/DEG mixture is the most efficient based on quantity employed since 6 parts by weight of the mixture is equivalent in performance to 20 parts by weight Paracril OZO, both compositions requiring only 25 seconds preheat time. It required 10 parts by weight Hycar 1312 to give good results but 60 seconds is required to obtain desirable temperature properties of the composition. The compounds shown in runs 3, 4, 5 and 9 are deemed to be unsuitable either because of incompatibility with the thermoplastic elastomer or showing relatively low efficiency in bringing the compositions to a moldable condition in comparison to the TEA/DEG agent used in run 2. The relatively poor results shown in run 7, even using a favorable concentration of TEA/DEG, suggests that careful consideration needs to be given to the components making up the compositions in order to achieve rapid melting of the compositions in a microwave field.

EXAMPLE 2

A series of compositions was prepared in which a polyethylene glycol was used along or in combination with TEA as a polarizing agent with a thermoplastic elastomer composition containing the following components in parts by weight as shown in Table 2A. The components employed are the same as described in Example 1 except when indicated otherwise.

TABLE 2A

| Thermoplastic elastomer | 100 |
|---|---|
| Poly(alpha-methylstyrene) | 25 |
| Crystal polystyrene | 15 |
| Naphthenic extender oil | 40 |
| Silica | 20 |
| Stabilizer[a] | 0.3 |
| Butyl zimate[b] | 0.5 |
| Polarizing Agent | See Table 2B |

Notes:
[a]Thiodiethylene bis(3,5-di-t-butyl-4-hydroxy) hydrocinnamate.
[b]Zinc dibutyldithiocarbamate.

The compositions were mixed as before and molded generally in the manner outlined previously. Specimens about 6×6 inches (15×15 cm) and about 100 mils (0.25 cm) thick were molded in this series. Preheating time for each mold assembly was 12 seconds and each composition was molded under a pressure of 80 psig (551 kPa gage) and cooled 20 seconds as described before.

The polarizing agents employed, quantities of each used and results obtained are given in Table 2B.

TABLE 2B

| Run | Polarizing Agent Type | Parts By Weight | Reactivity[a]/Flow |
|---|---|---|---|
| 1 | TEA/DEG (control) | 3/3 | Excellent/good |
| 2 | Carbowax 4000[b]/TEA | 3/3 | Excellent/good |
| 3 | Carbowax 6000[c]/TEA | 3/3 | Excellent/good |
| 4 | Carbowax 4000 | 3 | Slight/slight |
| 5 | Carbowax 6000 | 3 | None/none |
| 6 | Carbowax 6000 | 6 | Slight/fair |

Notes:
[a]A subjective, visual measure of effectiveness of microwaves in heating the compositions containing the polarizing agent.
[b]Union Carbide Corp., New York, NY, polyethylene glycol, average molecular weight of 4000.
[c]Like (b) except average molecular weight of 6000.

The good results in runs 1, 2 and 3 indicate that a polyethylene glycol is equivalent to diethylene glycol when used in combination with TEA in the compositions of the instant invention. The poor results shown in runs 4, 5 and 6 indicate that polyethylene glycol by itself is a less effective polarizing agent in this invention.

EXAMPLE 3

A series of combinations was prepared as described before by admixing a thermoplastic elastomer with generally the same components used in the first 2 examples. However, a resinous polar polymer was also included in the formulations as well as varying amounts of TEA/DEG. Molded samples were prepared from each composition in the manner described in Example 2 except that a variable preheat time was employed. The compositions prepared and results obtained are presented in Tables 3A and 3B. Unless otherwise described, the components, in parts by weight, are the same as previously used.

TABLE 3A

| | Compositions Employed | | | |
|---|---|---|---|---|
| Composition no. | A | B | C | D |
| Thermoplastic elastomer | 100 | 100 | 100 | 100 |
| Thermoplastic polar resin[a] | 20.5 | 20.5 | 20.5 | 20.5 |
| Poly(alpha-methylstyrene) | 17.5 | 17.5 | 17.5 | 17.5 |
| Naphthenic extender oil | 35 | 35 | 35 | 35 |
| Silica | 20 | 20 | 20 | 20 |
| Zinc stearate | 0.3 | 0.3 | 0.3 | 0.3 |
| Stabilizer 1[b] | 0.2 | 0.2 | 0.2 | 0.2 |
| Stabilizer 2[c] | 0.3 | 0.3 | 0.3 | 0.3 |
| UV stabilizer[d] | 0.3 | 0.3 | 0.3 | 0.3 |
| TEA | 0 | 0.5 | 1.0 | 3.0 |
| DEG | 0 | 0.5 | 1.0 | 3.0 |

Notes:
[a]Union Carbide Corp., New York, NY, RMD 4520, styrene/acrylonitrile resin.
[b]Described in Table 2A.
[c]Dilaurylthiodipropionate.
[d]Tinuvin P, described in Table 1A.

TABLE 3B

| | Results Obtained | | | |
|---|---|---|---|---|
| Composition | A | B | C | D |
| Molding time, sec. | 35 | 25 | 20 | 8 |
| 300% modulus | | | | |
| psi | 390 | 390 | 370 | 370 |
| MPa | 2.69 | 2.69 | 2.55 | 2.55 |
| Tensile Strength | | | | |
| psi | 680 | 700 | 680 | 670 |
| MPa | 4.69 | 4.83 | 4.69 | 4.62 |
| Elongation, % | 600 | 610 | 590 | 600 |
| Shore A Hardness | 69 | 69 | 72 | 73 |

The results show that compounds formulated according to the instant invention are easily moldable after preheat times ranging from 8 to 35 seconds in a microwave field. By adding from 0.5–3.0 parts by weight each of TEA and DEG, the preheat time is reduced from 35 seconds without the polarizing agent combination to 8 seconds with 6 parts by weight of the combination. Thus, excellent results are obtained by employing a polar resin in the compositions and particularly in combination with the preferred polarizing agent.

EXAMPLE 4

A composition was prepared, molded and evaluated according to the procedure employed in Example 3. In this example, however, a thermoplastic elastomer consisting of a radial teleblock butadiene/styrene (70/30) copolymer having a molecular weight of 300,000 and Shore A Hardness of 84 and not containing extender oil was employed in place of the thermoplastic elastomer used previously. The composition employed was identical to compostion A, Table 1A, except that the thermoplastic elastomer described above was used. A molding preheat time of 20 seconds was used.

The physical properties of the molded specimens were found to be as shown in Table 4.

TABLE 4

| 300% modulus | |
|---|---|
| psi | 410 |
| MPa | 2.83 |
| Tensile strength | |
| psi | 2350 |
| MPa | 16.2 |
| Elongation, % | 840 |
| Shore A Hardness | 66 |

The results show that excellent molding compositions can be prepared from thermoplastic elastomers consisting of teleblock butadiene/styrene copolymers of varying block styrene contents by employing the components described in this invention. When the compositions are heated by means of microwave energy for a period of time of less than 60 seconds, the compositions are softened sufficiently to be easily moldable under pressure of about 200 psig or less. Thus, low cost, low strength molds can be employed in molding the compositions and very rapid cycle times result in practicing this invention.

We claim:
1. A method for preparing molded articles comprising:
   (a) introducing into a mold and enclosing in the mold the molding composition consisting essentially of:
      (1) a thermoplastic elastomer that is a normally solid, linear or radial teleblock copolymer comprising about 30 to about 100 weight percent of the total polymeric component of the composition,
      (2) solid resinous polymer that is a polymer of a vinyl-substituted aromatic compound comprising from about 0 to about 70 weight percent of the total polymeric component of the composition, and
      (3) an amount ranging from about 0.5 to about 20 parts by weight per 100 parts by weight thermoplastic elastomer of a polarizing agent selected from among ethanolamines, isopropanolamines, and their hydrocarbyl-substituted derivatives;
   (b) applying microwave energy to said composition for a time sufficient to produce a moldable consistency in said molded composition;
   (c) supplying sufficient pressure up to about 200 psig to said molding composition for a time sufficient to produce a molded article;
   (d) cooling said mold and molded article; and
   (e) unmolding said cool molded article.
2. A method for preparing molded articles comprising:
   (a) introducing into a mold and enclosing in the mold a molding composition consisting essentially of:
      (1) a thermoplastic elastomer that is normally solid, linear or radial teleblock copolymer of butadiene-styrene copolymer comprising about 30 to about 100 weight percent of the total polymeric components of the composition,
      (2) solid resinous polymer that is a polymer of a vinyl-substituted aromatic compound chosen from among homopolymers of said aromatic compound and copolymers of said aromatic compound with acrylonitrile or a conjugated diene, said polymer of a vinyl-substituted aromatic compound comprising from about 0 to about 70 weight percent of the total polymeric component of the composition, and (3) an amount ranging from about 0.5 to about 20 parts by weight per 100 parts by weight thermoplastic elastomer of a polarizing agent selected from among simple and polymeric alkylene glycols, their mono- and di-alkyl esters and mixtures thereof;

(b) applying microwave energy to said composition for a time sufficient to produce a moldable consistency in said molded composition;

(c) supplying sufficient pressure up to about 200 psig to said molding composition for a time sufficient to produce a molded article;

(d) cooling said mold and molded article; and (e) unmolding said cool, molded article.

3. A method of claim 1 or 2 wherein in said molding composition said linear or radial teleblock copolymer is a butadiene-styrene copolymer in which the butadiene-styrene ratio is in the range of about 85/15 to about 45/55 parts by weight and which contains from about 10 to about 55 weight percent of the styrene incorporated as terminal polystyrene blocks and wherein the resinous polymer of the vinyl-substituted aromatic compound is a homopolymer or a copolymer with acrylonitrile or a conjugated diene.

4. A method of claim 1 or 2 wherein in said molding composition additionally contains components chosen from among fillers, plasticizing agents, antioxidants, UV stabilizers, and mixtures thereof.

5. A method of claim 4 wherein the additional components when present are in the range of: filler, about 10 to about 150 parts per 100 parts by weight thermoplastic elastomer; plasticizing agent, about 20 to about 50 parts per 100 parts by weight thermoplastic elastomer; antioxidant, about 0.1 to about 1 part per 100 parts by weight thermoplastic elastomer; and UV stabilizer, about 0.1 to about 3 parts per 100 parts by weight thermoplastic elastomer.

6. A method of claim 1 wherein the thermoplastic elastomer is a radial teleblock butadiene-styrene polymer in which the ratio of butadiene/styrene is 52/48, said polymer extended with 60 parts by weight naphthenic oil, said solid resinous polymer comprises poly(alphamethylstyrene) and polystyrene and the polarizing agent is chosen from triethanolamine, a mixture of triethanolamine and diethylene glycol, and a mixture of triethanolamine and polyethylene glycol said polyethylene glycol having an average molecular weight of 4,000 or 6,000.

7. A method of claim 1 wherein the thermoplastic elastomer is radial teleblock butadiene-styrene polymer in which the ratio of butadiene/styrene 52/48, said polymer extended with 60 parts by weight naphthenic oil, said solid resinous polymer is crystal polystyrene, and the polarizing agent is a mixture of triethanolamine and diethylene glycol.

* * * * *

UNITED STATES PATENT AND TRADEMARK OFFICE
CERTIFICATE OF CORRECTION

PATENT NO. : 4,288,399
DATED : September 8, 1981
INVENTOR(S) : Roy W. Siedenstrang et al It is certified that error appears in the above-identified patent and that said Letters Patent are hereby corrected as shown below:

Column 8, line 63 of claim 2, delete "components" and insert therefor --- component ---.

Column 10, line 25 of claim 7, after "butadiene/styrene" insert "is".

Signed and Sealed this

Sixth Day of April 1982

[SEAL]

Attest:

GERALD J. MOSSINGHOFF

*Attesting Officer*  *Commissioner of Patents and Trademarks*